United States Patent [19]

Haines

[11] Patent Number: 4,635,970
[45] Date of Patent: Jan. 13, 1987

[54] THRUST ROD ANCHOR FOR PIPE JOINT RESTRAINT SYSTEMS

[76] Inventor: Robert E. Haines, 4699 Chantry Ct., Columbus, Ohio 43220

[21] Appl. No.: 767,414

[22] Filed: Aug. 20, 1985

Related U.S. Application Data

[63] Continuation-in-part of Ser. No. 540,193, Oct. 7, 1983, abandoned.

[51] Int. Cl.$^4$ ............................................. F16L 13/04
[52] U.S. Cl. .................................. 285/114; 285/286; 285/368; 285/400; 285/404; 285/415
[58] Field of Search ............... 285/114, 368, 374, 412, 285/413, 400, 404, 286, 415; 24/270, 279; 29/237

[56] References Cited

U.S. PATENT DOCUMENTS

| 769,131 | 8/1904 | Dillenburg | 285/368 X |
|---|---|---|---|
| 940,098 | 11/1909 | Wehrle | 285/368 X |
| 3,144,261 | 8/1964 | Stephens | 285/114 |
| 3,252,192 | 5/1966 | Smith | 285/114 X |
| 3,333,872 | 8/1967 | Crawford et al. | 285/374 |
| 3,729,797 | 5/1973 | Ambrose | 285/21 X |
| 3,819,210 | 6/1974 | Daniel et al. | 285/223 X |
| 3,836,182 | 9/1974 | Miller | 285/114 |

FOREIGN PATENT DOCUMENTS 236716  11/1964  Austria ............................. 285/114

OTHER PUBLICATIONS

The Standard Mechanical Joint Retainer Gland Publication by Standard Fire Protection Equipment Co., Charlotte, N.C.
Pipeline Design for Water Engineers by Stephenson Elsevier Scientific Publishing Co., N.Y., 1981, pp. 53-56, 171-175.
Technolgy in American Water Development, Ackerman and Loft; Johns Hopkins Press, Baltimore, MD. pp. 5-10.
Water Supply Engineering; Babbit, Doland and Cleasby 6th Ed. McGraw-Hill, Book Co. Inc. N.Y. pp. 222,223; 144-149;340-341.

*Primary Examiner*—Dave W. Arola
*Attorney, Agent, or Firm*—Mueller and Smith

[57] ABSTRACT

A thrust rod anchor for utilization in conjunction with a tied form of pipe joint restrainer system. The anchor utilizes two arcuate band segments the ends of which are welded to elongate junction devices such as blocks. These junctions are bolted together in the course of assembling the anchor over the outside surface of a pipe. The assemblage of junctions and arcuate band segments support thrust rod connectors having apertures formed in thrust plates thereof advantageously spaced outwardly from the band segments. Spaced away from the thrust plates of each connector are pairs of set screws. A buttress arrangement is utilized to support the thrust plates of the tie rod connectors. The anchor assemblies have been shown to provide enhanced anchoring resistance to thrust forces and to be more facilly mounted upon a pipe surface.

22 Claims, 17 Drawing Figures

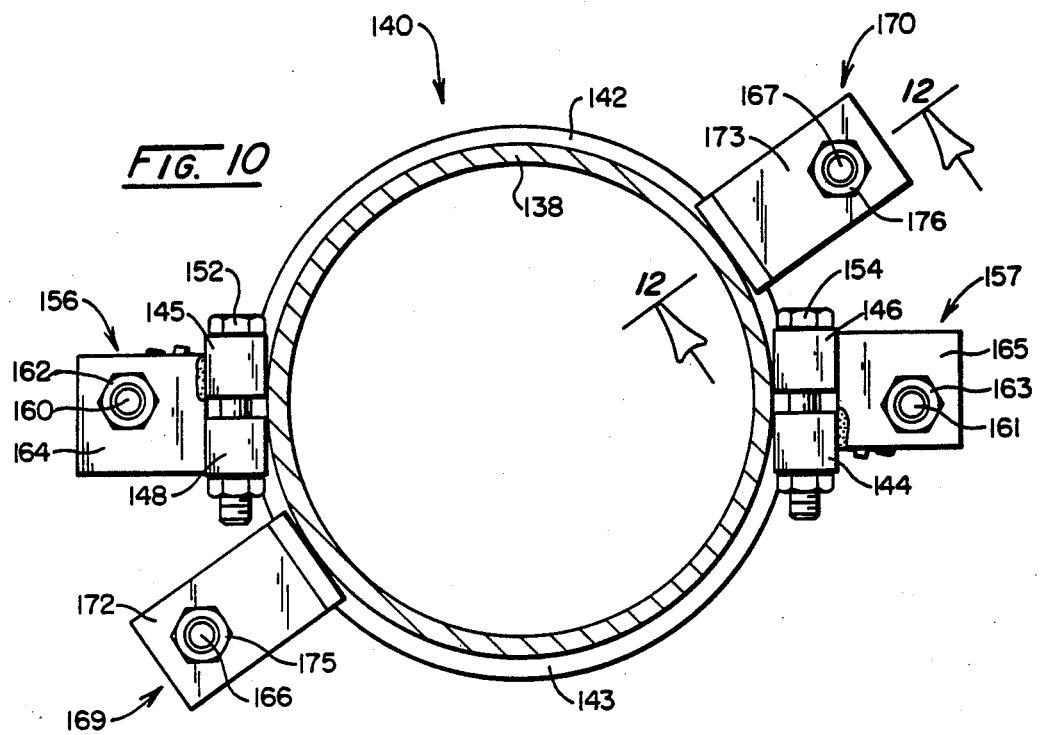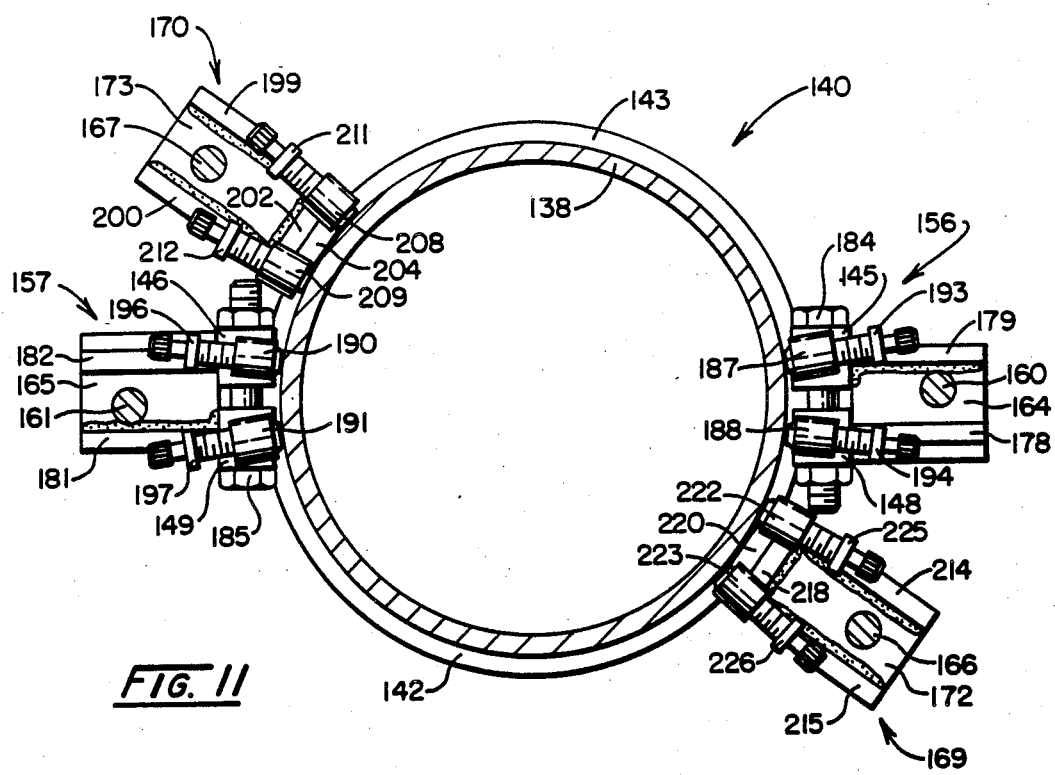

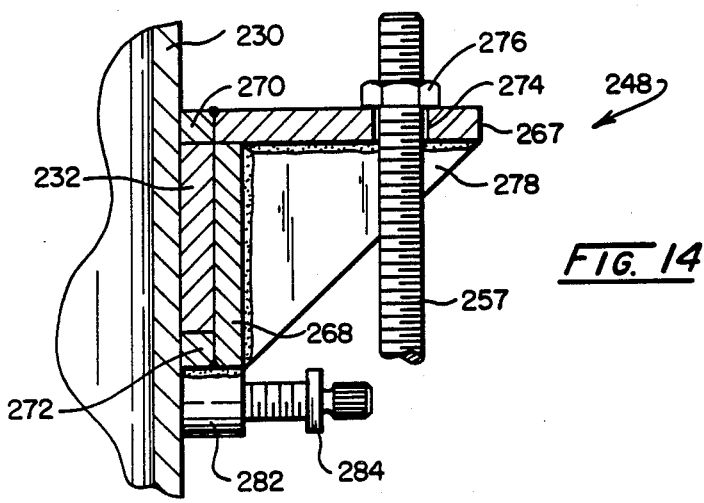
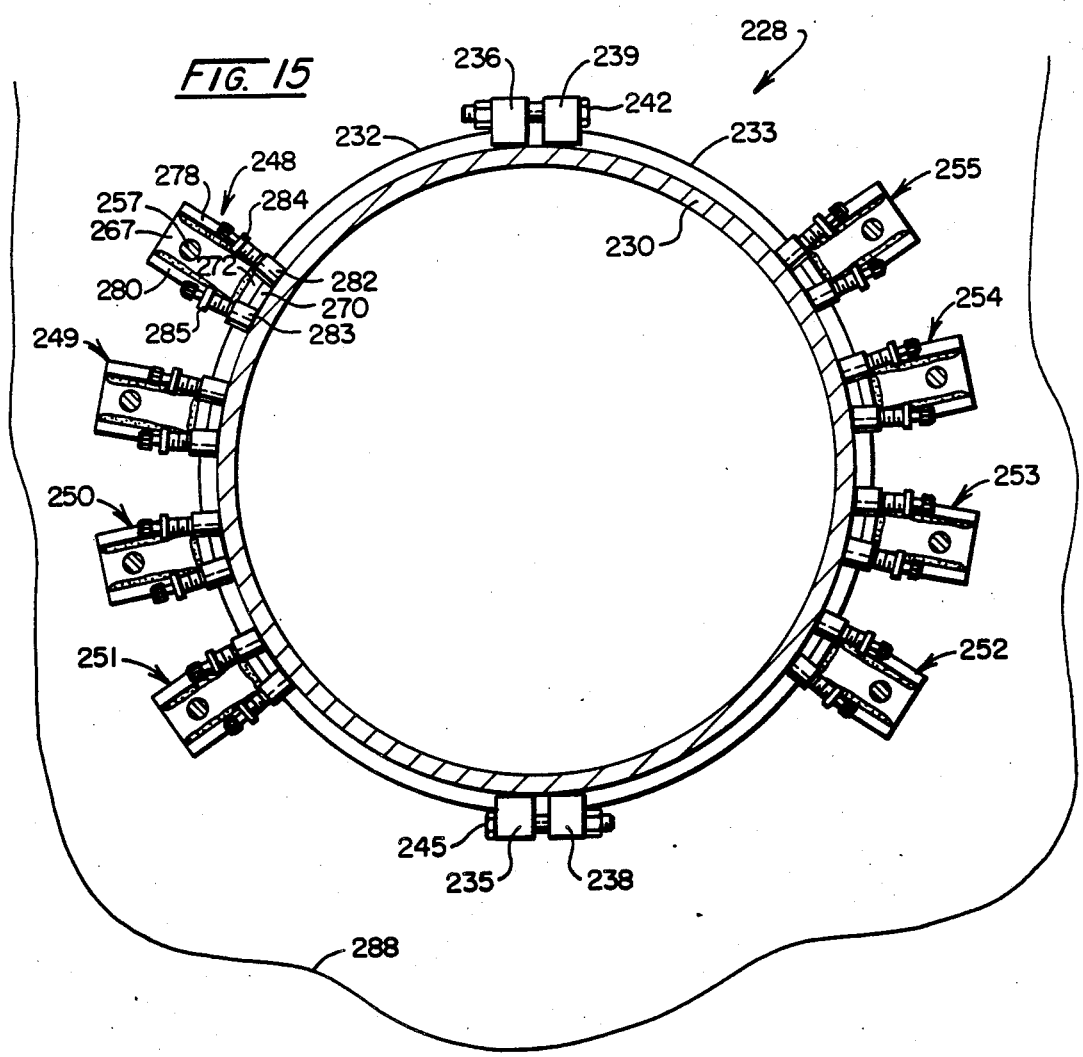

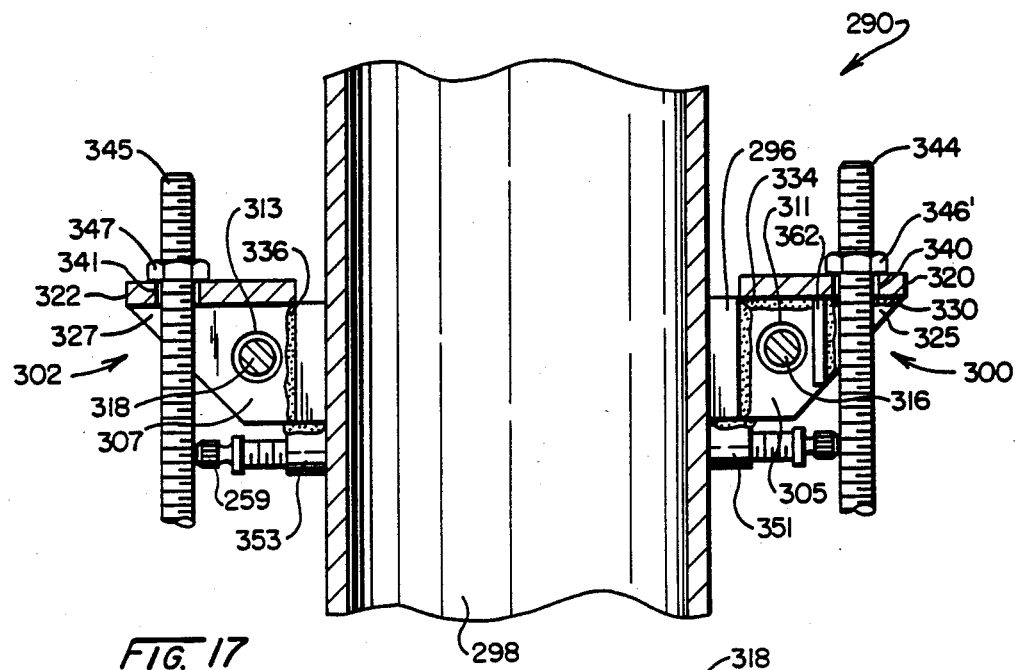

THRUST ROD ANCHOR FOR PIPE JOINT RESTRAINT SYSTEMS

RELATED APPLICATIONS

The present application is a continuation-in-part of U.S. application Ser. No. 540,193, filed Oct. 7, 1983, now abandoned entitled "Thrust Rod Anchor for Pipe Joint Restraint Systems" by Robert E. Haines.

BACKGROUND

A mastery of water-use techniques by civilization has been evidenced for thousands of years, one high point being reached with the development by the Romans of long-distance water transportation. Within the current century, the introduction of practical turbine pumps, large scale water storage and practical water transmission networks has greatly expanded public water supply systems. See in this regard:

I. "Technology in American Water Development" by Ackerman and Lof, the Johns Hopkins Press, Baltimore, Md.

Concomitant with the expansion of water transmission networks has been the development of improved piping techniques. For example, the DeLavaud process permitted a practical and improved centrifugal casting of pipe used in water supply networks, while in about 1948 further improvements in pipe construction were evidenced by the development of ductile iron pipe having important strength and corrosion resistance properties. To provide for practical assembly of pipeline matrix components, a variety of joining devices and techniques have been developed. The more popular of these approaches to joining pipe is referred to as a "bell-and-spigot" joint or push joint which is made by slipping a male or spigot end of one pipe section into the bell end of an adjacent pipe essentially until contact is made at the base of the bell. A flexible gasket positioned within the joint assures its water-tight integrity. As may be apparent, this construction is popular both due to the lowering of labor requirements for assembly and due to the simplicity and lower cost of pipes intended for such joining provisions.

A related joining approach utilized principally in the assembly of tees, elbows and plugs provides a mechanical joint wherein a flange is fabricated on one end of such a component or pipe length and a ring-shaped gland is positioned over the adjacent pipe end. By bolting the flange and gland together such that a flexible seal at the joint is compressed, a water-tight union is achieved. The pull-apart resistance or strength of such joint has been enhanced through the use of set screws in conjunction with the bolted gland, however, resort to such a joining technique in typically encountered lengthy runs of piping is both impractical and unduly expensive.

The design of a municipal piping matrix necessarily involves very long pipelines evidencing numerous directional changes and the resultant use of elbows and attendant joints, tee components leading to fire hydrants or user entities, as well as caps terminating a given matrix branch. Piping also may be joined, as well as repaired by sleeve type coupling devices. Such steel couplings are particularly useful where transitions are called for between pipes of different classes or sizes. Not only are bursting pressure stresses, pipe weight considerations, superimposed loads as are associated with backfill, water hammer stresses and the like contemplated by the designer, but also the longitudinal forces which become active whenever there is any change in the horizontal or vertical alignment of a length of pipeline must be accommodated for. In this regard, see the following publication:

II. "Pipeline Design for Water Engineers" by Stephenson, Elsevier Scientific Publishing Company, New York, 1981.

Without an appropriate accommodation, these longitudinal forces will cause pipe joints to separate. Accordingly, early pipeline design approaches resorted to the use of concrete thrust blocks at each pipeline bend which were structured to counteract: (a) the dynamic thrust due to change in direction of water flow, and (b) the thrust in the direction of each leg of a bend due to water pressure in the pipe.

One successful approach to assuring joint integrity against the above-described thrust forces has been through resort to tying techniques wherein spaced but adjacent flanged joint components are tied together by elongate thrust rods. To simplify the tying procedure, such innovations as "Tiebolts" have evolved to simplify thrust rod placement. See in this regard U.S. Pat. No. 3,144,261. A condition often occurs wherein the thrust rods used in tying a direction changing joint to an elongate run of pipe presents a condition wherein an anchoring flange is not available to provide a rearwardly disposed thrust rod connection. Under these conditions, a retainer clamp has been affixed to a length of such rearwardly disposed bell-and-spigot jointed pipe. Generally, the clamps have been of purely conventional design, two clamp components being bolted over the outer circumference of the pipe and retained in place on the pipe by clamping pressure. Thrust rods then were attached to the clamp outwardly of the bolts holding the clamp to the pipe and extended along and parallel to the pipe for attachment to the flanged component. In order to obtain adequate anchorage, the assembly team must position the retainer clamp a sufficient distance rearwardly along the length of pipe to provide for the resistances achieved by the mass of pipe itself, friction with the trench, associated back fill and the like. As a consequence, thrust rods of lengths approaching 200 feet have not been an unusual encounter.

Tests of the traditional retainer clamps have revealed that they are prone to excessive slippage under the thrust rod loads now evidenced in conventional piping systems. As is apparent, the amount of this thrust will vary in correspondence with the size of pipe utilized. One approach taken to improve anchoring capabilities for thrust rods is described in a copending application for U.S. Ser. No. 374,000 by the inventor hereof filed May 3, 1982, and entitled "Thrust Rod Anchor for Pipe Joint Restraint Systems" and now U.S. Pat. No. 4,492,391. While achieving significantly improved anchoring performance, the anchor described in the application is designed such that the thrust rods are incorporated in close proximity to the outer surface of the pipe itself when installed. As a consequence, the device cannot be used where the thrust rods must pass over intermediately disposed sleeves or couplings and the like. It has been determined that a considerable number of applications require a feature wherein the thrust rods are outwardly disposed from the pipe to permit passage over intermediately disposed connecting components. Additionally, it is important that the tie rods be installed such that there is no contact between the tie rods themselves and the surface of the pipe. A further difficulty resides in the use of set screws which are conventionally incorporated in the anchor to enhance the anchoring capabilities thereof. Typical set screws are configured having knurled tips which tend to extend excessively into the surface of the pipe on which the anchor is to be installed. Anchoring structures have been observed to warp or stretch in the course of their installation. As a consequence, installing personnel have caused the set screws to be rotated an excessive amount to achieve desirable torque. For example, preferred set screws are configured having a break-off portion to which the installer applies a wrench and rotates the set screw until such time as about 80 foot pounds torque is achieved whereupon the portion engaged by the wrench is sheared off. Where excessive rotation occurs due to clamp warpage or the like, this additional rotation required of the set screws causes them to "drill" into the pipe surface an excessive amount. In some instances this drilling effect will extend completely through a pipe wall. Where softer iron pipe is encountered, it is desirable that lower torques be employed in tightening set screws to avoid excessive drilling.

Another aspect involved in the utilization of tie rod anchor structures resides in the installation of the anchors and tie rods within the trenches or similar environment of their use. For example, many prior anchor structures involve an installation procedure wherein set screws or bolts must be tightened while they are positioned on the underside of the pipe upon which the anchor is being installed. The difficulties of such installation are apparent. It is desirable that the tie rods and all bolts or the like which must be tightened during installation be readily accessible to the installer from the top or side of the pipe.

SUMMARY

The present invention is addressed to improved thrust anchors used as components of pipe joint restrainer systems wherein tying techniques are employed. The anchor structure of the invention permits the positioning of tie rods well outwardly from the surface of the pipe upon which they are mounted while maintaining highly effective thrust restraint performance. Further, improved thrust restraint performance is achieved with the anchor structure while the procedures required for its mounting upon pipe by field personnel are simplified. Because of its improved design, the thrust restraining performance of the anchor structure of the invention may be maintained even though set screw components thereof are tightened at torque values much lower than heretofore thought necessary. As a consequence, the anchor structure may be employed in water distribution systems utilizing relatively softer iron piping.

An object and feature of the invention is to provide a thrust rod anchor for connection to a pipe of given external surface diameter which includes an arcuate band arrangement having at least two arcuate band segments of predetermined width, each having an inwardly disposed surface of diameter substantially corresponding with the pipe external surface diameter and having a predetermined circumferential length extending between its ends so as to be mountable in end-to-end configuration around the surface of the pipe. Junction means are provided which are fixed to each arcuate band segment end and have a joining surface extending outwardly therefrom. Connectors are provided for drawing adjacently disposed joining surfaces of each junction means towards each other to tension the band about the pipe external surface. At least two selectively spaced thrust rod connectors, each having a thrust bearing plate are rigidly supported by the assemblage of the arcuate band arrangement and junction means and serve to restrain forces developed within the thrust rods along a predetermined direction from a remote connection of the rod. Each of the thrust bearing plates is formed having an opening for receiving a thrust rod and the opening is spaced a predetermined distance from the pipe external surface when the anchor is mounted thereupon. Each of the thrust rod connectors includes a buttress arrangement extending toward the pipe remote connection which is rigidly supported by the assemblage for restrainably supporting the thrust bearing plate.

Another feature and object of the invention is to provide a thrust rod anchor for connection to a pipe of given external surface diameter which includes an arcuate band arrangement having at least two arcuate band segments of predetermined width, each having an inwardly disposed surface of diameter substantially corresponding with the pipe external surface diameter and having a predetermined circumferential length extending between its ends so as to be mountable in end-to-end configuration around the surface of the pipe. A junction block is fixed to each arcuate band segment end which extends outwardly from the widthwise extent of the band segment and which has an inwardly disposed surface positioned in substantial adjacency with the inwardly disposed surface of the arcuate band segment. The junction block further is formed having a joining surface extending outwardly from the inwardly disposed surface thereof. Connectors are provided for drawing adjacently disposed joining surfaces of adjacent pairs of the junction blocks towards each other to tension the arcuate band arrangement about the pipe external surface. At least two selectively spaced thrust rod connectors, each having a thrust bearing plate are rigidly supported by the assemblage of the arcuate band arrangement and junction blocks and serve to restrain forces developed within the thrust rods along a predetermined direction from a remote connection of the rods. Each of the thrust bearing plates is formed having an opening for receiving a thrust rod and the opening is spaced a predetermined distance from the pipe external surface when the anchor is mounted thereupon. Each of the thrust rod connectors includes a buttress arrangement extending toward the pipe remote connection which is rigidly supported by the assemblage for restrainably supporting the thrust bearing plate.

As another object of the invention, the above-noted arcuate band segment circumferential lengths are selected such that adjacent junction block joining surfaces are spaced apart subsequent to drawing them towards each other. This feature contributes to the simplification of mounting the anchor structure upon the pipe.

As another object of the invention, the above-described thrust anchor is provided including an indent arrangement supported from the assemblage at a location adjacent the thrust rod connectors and spaced from the thrust bearing plate toward the remote pipe connection for generating and engaging within a recess upon the pipe external surface. This indent arrangement preferably is provided as two set screws positioned adjacent and substantially mutually symmetrically disposed upon opposite sides of a thrust rod when received by the thrust bearing plate. As another feature and object of the invention, the thrust bearing plate may be positioned a predetermined distance outwardly from the widthwise extent of the arcuate band segments with respect to the side thereof most remote from the indent or set screw arrangement. This feature permits a minimization of warping of the arcuate band segments.

Other objects of the invention will, in part, be obvious and will, in part, appear hereinafter.

The invention, accordingly, comprises the apparatus and system possessing the construction, combination of elements, and arrangement of parts which are exemplified in the following detailed disclsoure. For a fuller understanding of the nature and objects of the invention, reference should be had to the following detailed description taken in connection with the accompanying drawings.

BRIEF DESCRIPTION OF THE DRAWINGS

FIG. 10 is one end view of another embodiment for a thrust anchor according to the invention;

FIG. 11 is an opposite end view of the thrust rod anchor depicted in conjunction with FIG. 10;

FIG. 14 is a sectional view of a thrust rod connector shown in FIG. 13 and taken through the plane 14—14 thereof;

FIG. 15 is an opposite end view of the thrust anchor embodiment shown in FIG. 13;

FIG. 16 is a perspective view of another embodiment of a thrust anchor according to the invention showing components thereof in exploded fashion; and FIG. 17 is a sectional view taken centrally of the pipe and thrust anchor of FIG. 16.

DETAILED DESCRIPTION

The longitudinal forces which are developed by fluid flow around bends and which now may be accommodated for by tying systems have long been the subject of evaluation. For example, the longitudinal tension resulting from the flow of water around a 90° bend in a closed conduit flowing full of water may be computed from the expression:

$$(I) \quad T = WAV^2/g + pA$$

where
W = unit weight of water;
A = cross-sectional area of pipe;
V = velocity of flow of water;
g = acceleration due to gravity; and
p = intensity of internal bursting pressure.

Figure 1:
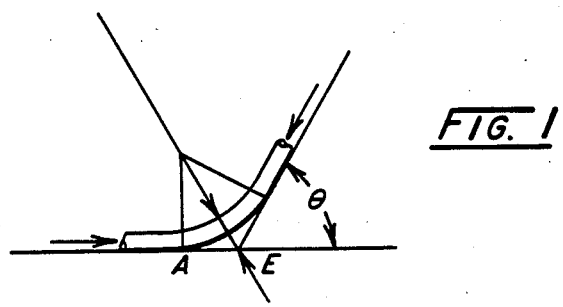
FIG. 1 is a diagrammatic representation of a pipe encountering fluid change of direction and employed in analyzing thrust forces generated thereby.

Now, considering the early approach to accommodating for such thrust forces, reference is made to FIG. 1 wherein a closed conduit is represented containing fluid flowing around a bend of an extent represented by angle, $\theta$. In early practice, a buttress formed of concrete or the like would be designed and positioned for resisting the illustrated resultant force, E. This resultant force may be described as having a magnitude as follows:

$$(II) \quad E = 2A\left(\frac{WV^2}{g} + p\right)\sin\frac{\theta}{2}$$

In general, it is this form of thrust force for which modern tying systems are designed. For further information concerning the above, reference is made to the following publications:

III. *Water Supply Engineering* by Babbit, Doland, and Cleasby, 6th Ed. McGraw-Hill Book Company, Inc., New York.

IV. *Elements of Water Supply Engineering* by Waterman, 2d Ed. John Wiley & Sons, Inc., New York.

Figure 2:
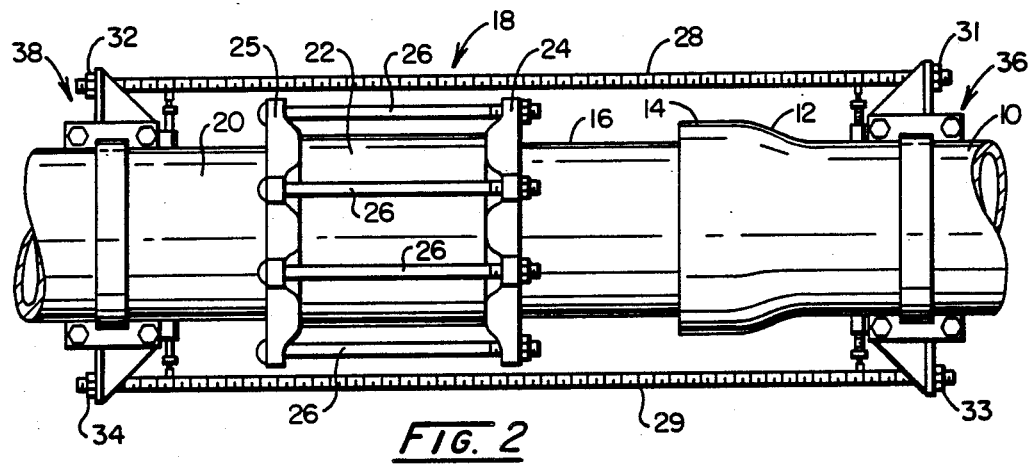
FIG. 2 is a top view of a bell and spigot water pipe connection as well as a sleeve coupling, the figure showing the utilization of anchor components and thrust rods in conjunction with such an assemblage.
Figure 3:
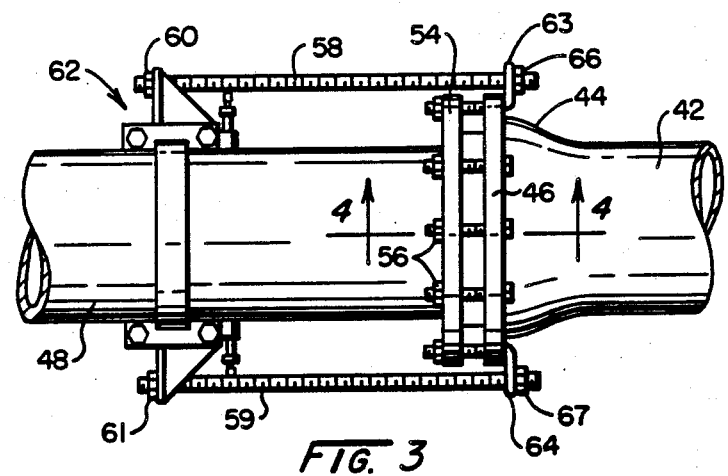
FIG. 3 is a top view of a water pipe joint showing the use of tie rods connecting between a flange component and a thrust anchor according to the invention.
Figure 4:
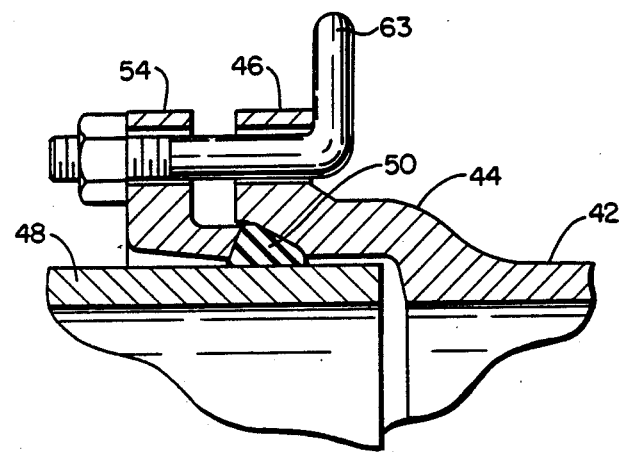
FIG. 4 is a partial sectional view taken through the plane 4—4 of FIG. 3.

Looking now to FIGS. 2-4, pipe joint structures conventionally utilized by the industry are shown in conjunction with joint restrainer tying techniques typically employed but configured in conjunction with the preferred embodiment of a thrust rod anchor according to the invention. FIG. 2 shows a pipe component 10 having an end tapering as at 12 to form a female, bell portion represented generally at 14. A spigot or male end of the next adjoining pipe portion 16 is inserted as far as possible into bell 14 until substantially nesting against an inwardly disposed flange as shown in FIG. 4. Generally, a flexible gasket is incorporated within bell portion 14 to assure the water tight integrity of the joint. Additionally shown in FIG. 2 is a structure 18 which may be provided for repair purposes or for securing an abutting union of two pipe components as at 16 and 20 through the utilization of a cylindrically shaped sleeve 22 which is retained in position by an assemblage of gasket containing followers 24 and 25. Followers 24 and 25 are retained against the sleeve 22 by a plurality of bolt and nut connectors as at 26. Note that the structure extends outwardly somewhat from the surfaces of pipe components 16 and 20.

The integrity of the joint between pipe component 16 and bell 14, as well as that of the structure 18 is restrained against thrust induced failure or "blow-out" by two oppositely disposed thrust rods 28 and 29 which are attached by nuts 31-34 to two spaced thrust rod anchors fashioned in accordance with the instant invention and represented generally at 36 and 38.

In another arrangement representing utilization of the anchoring arrangement of the invention, as illustrated in FIG. 3, a pipe component 42 is provided having a bell shaped portion represented at 44 which is integrally formed with an annular flange 46. Flange 46 has a series of connector openings or apertures regularly spaced around it. For the most part, such components as at 42 are associated with implements having a function changing the direction of fluid flow, such as tees, elbows, and the like wherein dynamic thrust conditions are encountered. Component 42 is shown in connection with a conventional pipe component 48 having a typical "spigot" ending.

Looking again to FIG. 4, the joint structure of FIG. 3 is shown in detail, the end of pipe component 48 being shown having been inserted within bell portion 44 of component 42 essentially to a nesting position against the inwardly disposed flange thereof. A rubber gasket 50 is shown positioned intermediate components 42 and 48 and urged into place by the inwardly protruding portion 52 of a ring shaped or annular gland 54.

Returning to FIG. 3, the gland 54 is shown attached to flange 46 by bolt and nut connectors as at 56. Tying procedures for the joint thus developed may be provided through the use of thrust rods 58 and 59 which extend from connection by respective nuts 60 and 61 abutting against thrust anchor 62 to Tiebolt assemblies 63 and 64 which extend, as shown in FIG. 4, through two of the aligned openings within flange 46 and gland 54. With this arrangement, a bolted connection may be effected for tie rod 58 as at 66 and for tie rod 59 as at 67.

Note that in each of the arrangements shown in FIGS. 2 and 3, the associated thrust anchors as at 36, 38, or 62 are located upon a portion of pipe which is uninterrupted or "straight", no bearing surface protruding outwardly therefrom to provide an anchoring connection. Such a protruding surface, for example, may be provided by the arrangement including flange 46 shown in FIGS. 3 and 4. Additionally, on occasion, the pipe installer may use the protruding surface of a bell as at 14 to provide a buttress for anchoring purposes. However, in a significant number of installation situations, no such transverse bearing surfaces are available to the installer and resort must be made to some form of restraint associated with an uninterrupted or non-deformed pipe profile.

The thrust rod anchors of the invention are called upon to anchor or restrain the thrust loads imposed from the tie rods as at 28 and 29 or 58 and 59 from positions of connection therewith which are somewhat spaced from the surface of the pipe structures being tied together. This geometry is desired in order to permit the utilization of the tie rods in conjunction with structures as at 18 and the like. However, the positioning of the thrust rods in such outwardly disposed orientations involves the development of moments which normally will have a twisting or warping effect upon the structure of the thrust rod anchors. The amount of thrust which these anchors are called upon to restrain varies generally with the nominal diameter of the pipe upon which the anchors are positioned and, at times, in conjunction with the amount of fluid pressure within the pipes. Conventionally, an operating pressure of about 100 psi will be encountered. Thus, the total amount of thrust to be restrained by the anchors will be smaller for smaller nominal diameter pipes and will extend to quite large values as the pipe is increased in size, for example, to about 24 inches or more nominal diameter. To accommodate for the higher thrust loads of the pipe as diameters increase, additional thrust rods must be utilized to achieve requisite gross cross-sections of tensioned thrust rod steel. Particularly as the larger diameter pipes are encountered, it has been found desirable to utilize set screws in conjunction with the anchor structures. However, the use of these set screws must be such that they may be "torqued" to adequate force levels while not being rotated excessively and thus "drilling" into the surface of the pipe. Further, as the thrust loads are imposed upon the anchor structures from the thrust rods, the resultant deformation of the anchor structures which might occur must be so controlled so as not to affect the holding capabilities otherwise provided by the set screws. Of course, other indenting techniques may be utilized as substitutes for set screws, for example usig hardened indenting set points or the like fixed in place through the anchors, however, set screws are preferred for the instant function.

In order to achieve requisite anchoring performance, the thrust anchor of the invention employs a structure of basic components which may be selectively arranged in accordance with the particular diametric size of pipe involved. These principal components of the anchor structure are the arcuate steel bands which extend to junction blocks fixed to either end thereof. The junction blocks are drawn together so as to tension the bands about the outer periphery of the pipe upon which the assemblage is mounted. The assemblage of arcuate bands and junction blocks support at least two spaced thrust rod connectors which are arranged in accordance with the diameter of pipe involved. As is apparent, as such diameter increases, the total thrust load which must be restrained by the anchor structure increases considerably.

Figure 5:
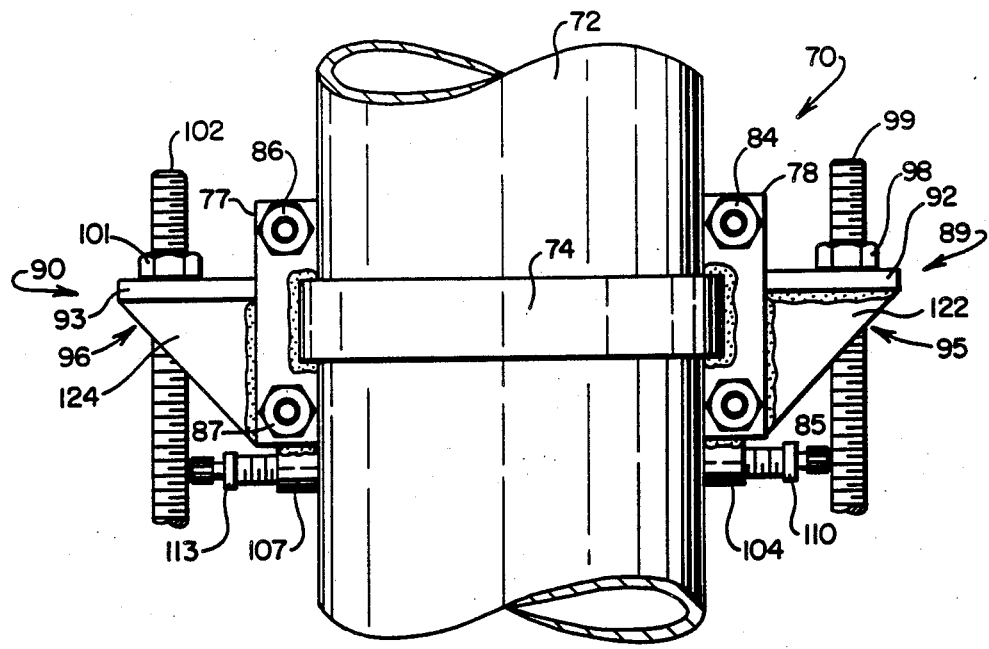
FIG. 5 is a top view of one embodiment of a thrust anchor in accordance with the instant invention.
Figure 6:
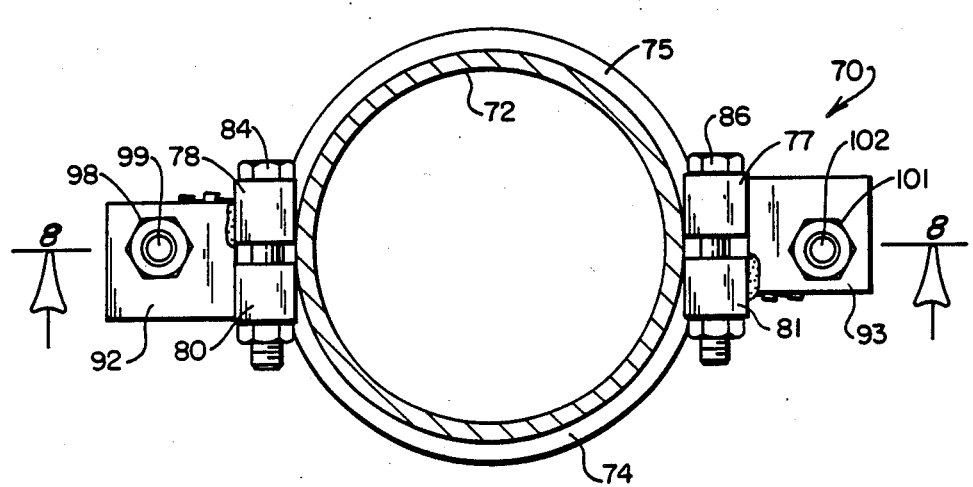
FIG. 6 is one end view of the thrust anchor depicted in FIG. 5.
Figure 7:
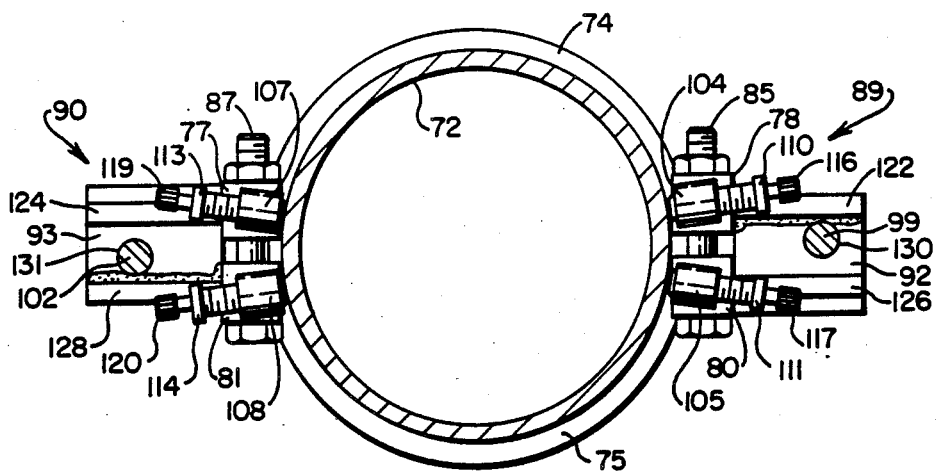
FIG. 7 is an opposite end view with respect to FIG. 6 of the thrust anchor shown in FIG. 5.
Figure 8:
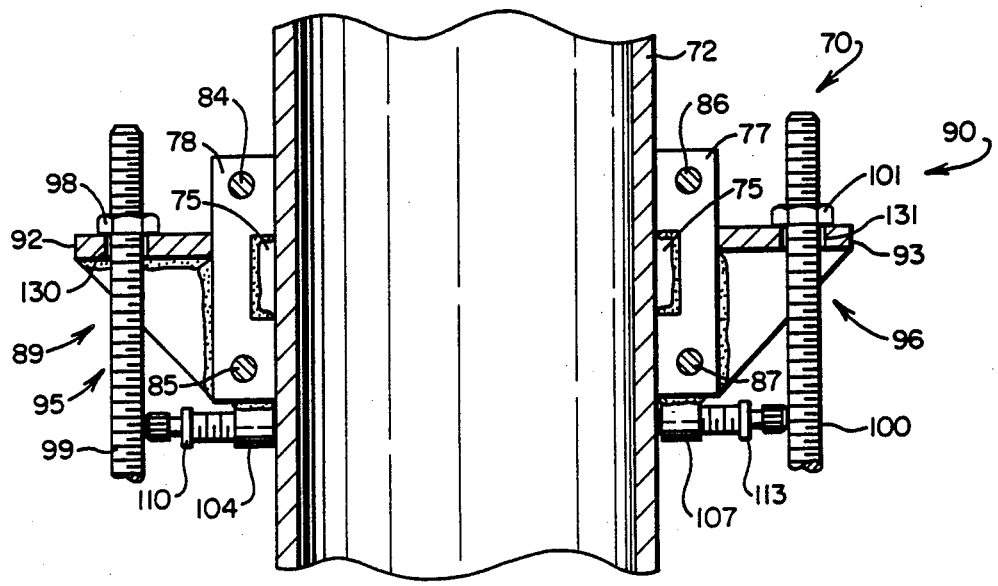
FIG. 8 is a sectional view of the thrust anchor arrangement of FIG. 6 taken through the plane 8—8 shown therein.
Figure 9:
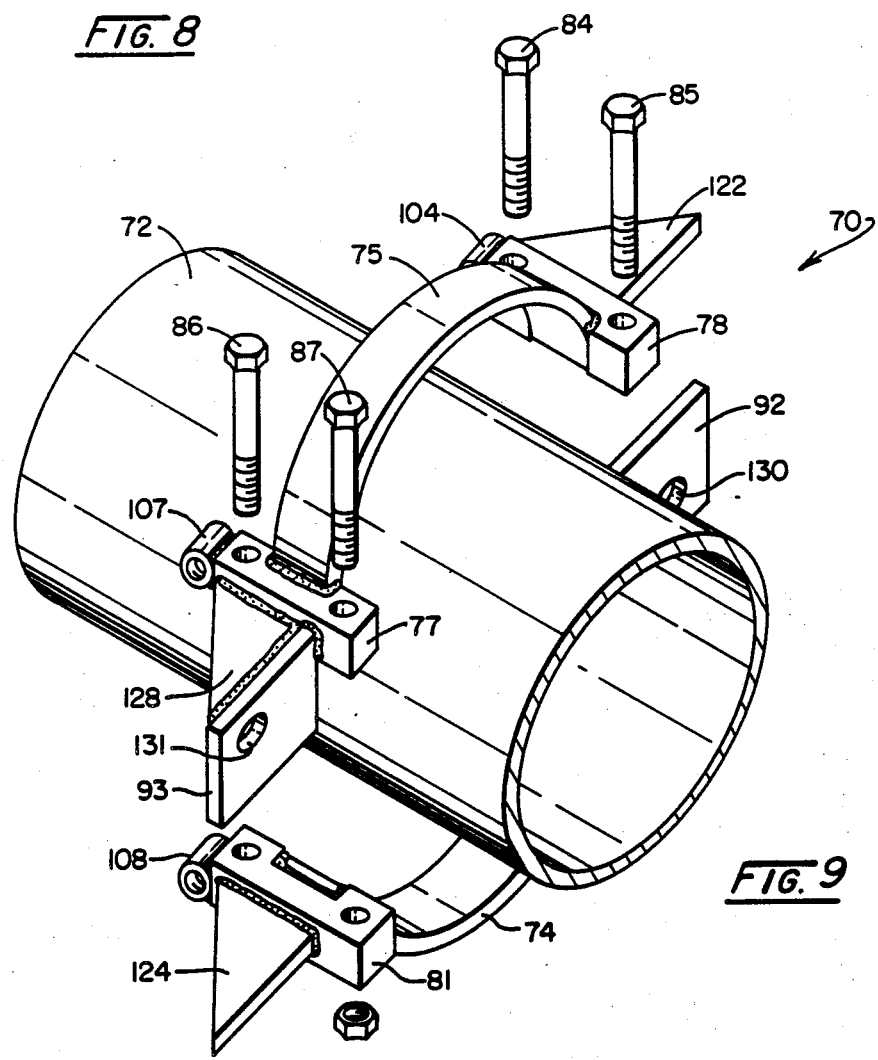
FIG. 9 is a perspective view showing the thrust anchor of FIG. 5 in exploded fashion.

FIGS. 5 through 9 show a thrust anchor embodiment according to the invention which is preferred for use in conjunction with pipe sizes which range from a nominal 3 inch diameter through a 12 inch nominal diameter. Referring to FIG. 5, a top view of the anchor structure is shown generally at 70 in conjunction with a portion of pipe 72 over which it is secured. The anchor structure 70 includes two arcuate band segments, the uppermost one of which is shown at 74. An identical band segment 75 extends about the opposite half of pipe 72 as revealed in the opposite end views of anchor 70 as shown in FIGS. 6 and 7. Band segment 74 extends slightly less than half way across the surface of pipe 72 and is weldably fixed to oppositely disposed junction blocks 77 and 78. In similar fashion, the end portions of arcuate band segment 75 are weldably fixed to junction blocks 80 and 81 as shown in FIGS. 6 and 7. The welded assemblages of arcuate band segments 74 and 75 along with the respectively associated junction blocks 77, 78 and 80, 81 are drawn together over the surface of pipe 72 by four bolt and nut connectors 84–87. FIGS. 6 and 7 reveal that a small gap, for example on the order of about ¼ inch is present between the adjacently disposed joining surfaces of junction blocks, for example, between junction blocks 77 and 81 and between blocks 78 and 80 subsequent to tightening. With this arrangement, the bolt and nut connectors 84–87 may be tightened by field personnel to achieve desirable tightness of the segments 74 and 75 about the surface of the pipe 72. Were the junction blocks to touch, then such requisite tightening would not be assured. Generally, the band segments 74 and 75 for the instant anchor embodiment 70 are selected as being formed of hot rolled steel having a thickness of about ½ inch and a width of about 2 inches. Each of the junction blocks have been found to be effective when fabricated having a cross-section which is about 1½ inches square. The blocks preferably are about 6 inches long so as to position the connectors 84-87 sufficiently outwardly to facilitate field personnel access thereto. FIG. 9 reveals the connection of each junction block with an associated band segment. Looking to that figure, note that the inwardly disposed surface of each block 77 and 78 adjacent pipe 72 is, in turn, in substantial adjacency with the inwardly disposed surface of band segment 74. Thus, when bolt and nut connectors 84-87 are tightened, the resultant tensioning force is imposed very closely to the band segments. This aids the structure in the avoidance of warp phenomena developed by forces imposed from the thrust rods.

FIG. 5 further reveals that anchor structure 70 incorporates two oppositely disposed thrust rod connectors represented generally at 89 and 90. Each of the connectors includes a thrust bearing plate shown respectively at 92 and 93 which are braced by respective buttressing structures 95 and 96. Openings or apertures 130 and 131 are formed within respective thrust plates 92 and 93 for receiving the threaded ends of thrust rods 99 and 102 at an outwardly disposed location. The thrust plate 92 and associated buttress arrangement 95 are supported upon the adjacently disposed junction blocks 78 and 80, while the corresponding thrust bearing plate 93 and associated buttress assemblage 96 are supported from adjacently disposed junction blocks 77 and 81. When so supported, the thrust loads, for example from the nut 98 connection with thrust rod 99, are impressed upon the anchor assembly 70 through thrust rod connector 89, while, correspondingly, thrust is imposed from nut 101 and thrust rod 102 upon thrust bearing plate 93 of thrust rod connector 90. Note with this structure, that the thrust rods 99 and 102 are supported substantially outwardly from the outer surface of pipe 72 to provide clearance over an intermediate connecting structure.

FIGS. 5 and 7 further reveal that the anchor structure 70 incorporates a set screw assemblage in conjunction with each of the thrust rod connector assemblies 89 and 90. In this regard, note that internally threaded set screw connectors 104 and 105 are weldably fixed to one end each of junction blocks 78 and 80. Correspondingly, identical set screw connectors 107 and 108 are welded to the ends of respective junction blocks 77 and 81. The set screw connectors 104, 105 and 107, 108 are positioned at a location straddling the thrust rods with which they are associated. For example, FIG. 7 reveals that connectors 104 and 105 retaining respective set screws are positioned so as to straddle thrust rod 99, while connectors 107, 108, supporting respective set screws 113 and 114 are seen to straddle thrust rod 102. Additionally, it may be observed from FIG. 5 that the set screw connectors position the set screws associated with them remotely from the thrust plate components of the connector assemblies 89 and 90, this displacement being in the direction towards the oppositely disposed remote connection of thrust rods 99 and 102. This geometry achieves a thrust induced moment at each of the thrust rod connector assemblies tending to urge the set screws 110, 111 and 113, 114 which are symmetrically disposed with respect to the thrust rods, into the surface of pipe 72. As a consequence, the number of turns required to properly torque these set screws is ideally minimized and the earlier-described "drilling" phenomena is minimized, a proper indentation of the set screw ends being achieved. The geometry shown also has been found to permit the utilization of lower torques for the set screws, for example, in the 30 to 50 foot pound range. The set screws preferably are structured such that field personnel torque the uppermost component thereof, for example as shown at 116 and 117 with respect to set screws 110 and 111 (FIG. 7) until that component breaks off. Such breaking off will occur at about the torque value desired. In similar fashion, the torque components 119 and 120 of respective set screws 113 and 114 are utilized in the same manner to achieve proper torque values.

Thrust rod anchor assembly 70 is designed such that it is formed of two identical substructures which when combined utilizing the connectors 84-87, effect the assembly of thrust rod connectors 89 and 90. In this regard, note in FIG. 5 that triangular support 122 of buttress assembly 95 is welded to thrust bearing plate 92 as well as to junction block 78. On the other hand, the corresponding triangular support 124 of buttress assembly 96 is welded only to junction block 77 and is in unconnected abutment with thrust bearing plate 93. FIG. 7 shows that triangular support 126 of connector assembly 95 is in similar abutment, not welded to thrust bearing plate 92, while a triangular support 128 of buttress assembly 96 is welded to thrust bearing plate 93 as well as to junction block 81.

With the arrangement shown, any two of these identical subsassemblies of the anchor structure 70 may be joined together, as represented pictorially in FIG. 9, over the pipe segment 72 to form a complete assemblage. As is apparent, with the assemblage, one thrust bearing plate and an associated triangular support member is welded to the junction block of one end of an arcuate band segment, while a singular triangular support is welded to the junction block at the opposite end of that arcuate band. Because in the process of tightening the connectors as at 84-87, the non-welded abutting triangular support will slide across an associated thrust bearing plate as at 92 or 93, the openings or apertures 130 and 131 within the thrust bearing plates receiving the thrust rod anchors are displaced toward the triangular support welded to the associated thrust bearing plate. Returning to FIG. 7, this offset relationship may be observed at opening or aperture 130 receiving thrust rod 99 and at aperture or opening 131 receiving thrust rod 102.

Where joint restraint is required in conjunction with pipes having nominal diameters in the 10 to 12 inch category, the greater thrust forces involved will necessitate enhanced thrust rod structuring. This enhanced structuring generally is provided by the utilization of four instead of two thrust rods and, thus, an effective additional two thrust rod connectors are required.

Referring to FIG. 10, a thrust rod anchor structure having this enhanced capability of accommodating higher thrust forces for the noted pipe sizes is represented generally at 140. Positioned over a pipe represented at 138, thrust anchor structure 140 includes the earlier-described basic components of the anchor structure of the invention among which are two arcuate band segments 142 and 143. The ends of band segment 142 are welded to junction blocks 145 and 146, while the ends of arcuate band segment 143 are welded to junction blocks 148 and 149. Junction blocks 145 and 148 are coupled and drawn together by bolt and nut connectors, one of which is shown at 152, while a corresponding connector 154 is provided to connect and draw together junction blocks 146 and 149. When so coupled, the junction blocks 145 and 148 define a thrust rod connector structure represented generally at 156, while the coupled together junction blocks 146 and 149 serve to define a thrust rod connector structure represented generally at 157. The anchor structure 140 thus far described is identical to structure 70 as discussed in conjunction with FIGS. 5 through 9 hereinabove. The structure serves to support thrust rods 160 and 161 through respective nut connections 162 and 163 in identical fashion as earlier described.

To provide for the anchoring of two additional thrust rods 166 and 167, the anchor structure 140 incorporates two additional thrust rod connector assemblies 169 and 170. Assemblies 169 and 170 include respective thrust bearing plates 172 and 173 against which respective thrust rods 166 and 167 are restrained by a thread and nut connection including respective nut components 175 and 176.

Thrust rod connector assemblies 169 and 170 are identically structured and may be observed to be positioned in adjacency with connector structures 156 and 157 at diametrically opposite locations upon the anchor assembly 140.

Referring to FIG. 11, an opposite end view of the anchor structure 140 is provided. The figure reveals that thrust rod connector structures 156 and 157 include the earlier-described triangular buttress members as at 178 and 179 in association with the thrust bearing plate 164 of connector 156 and additional buttress members 181 and 182 in association with the thrust bearing plate 165 of connector assembly 157. The figure further reveals the two additional nut and bolt connectors 184 and 185 utilized in drawing the junction blocks associated with connector assemblies 156 and 157 together. Also revealed in the drawing are the set screw connectors 187 and 188 welded to respective junction blocks 145 and 148 and the corresponding set screw connectors 190 and 191 welded, respectively, to junction blocks 146 and 149. Connectors 187 and 188 are internally threaded to retain respective set screws 193 and 194, while corresponding set screw connectors are shown retaining respective set screws 196 and 197.

Figure 12:
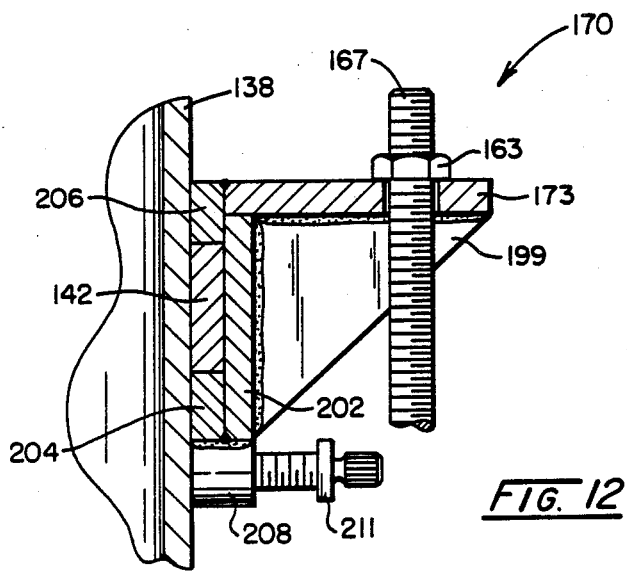
FIG. 12 is a sectional view of a thrust rod connector shown in FIG. 10 and taken through the plane 12—12 shown therein.

Looking additionally to FIG. 12, the structure of thrust rod connector assembly 170 is revealed. Similar in general structure to connector assemblies 156 and 157, connector assembly 170 includes triangular shaped buttresses as at 199 and 200 which are welded to thrust bearing plate 173. However, the lower or inward sides of triangular supports 199 and 200 are welded to a base plate 202, which, in turn, is welded to arcuate band segment 142. Filler blocks 204 and 206 are positioned upon opposite sides of the segment 142 and, additionally, are welded to base plate 202, block 206 being welded additionally to thrust plate 173. The inwardly facing surface defined by filler block 204 and base plate 202 provides support to which set screw connectors 208 and 209 are welded. Connectors 208 and 209 are internally threaded to support respective set screws 211 and 212.

Thrust rod connector assembly 169 is identically structured identically to assembly 170, and includes triangular support members 214 and 215 which are welded to thrust bearing plate 172 as well as to a base plate 218. Base plate 218 is welded to filler blocks as described in conjunction with assembly 170 in FIG. 12, one such filler block being shown at 220. Filler block 220 and base plate 218 combine to provide a surface to which set screw connectors 222 and 223 are welded. Set screw connectors 222 and 223 are shown threadably retaining respective set screws 225 and 226.

The structuring of thrust rod connector assemblies as at 169 and 170 are ones which advantageously minimize the amount of warp or twist which is induced into the band segments 140 and 143 upon the imposition of thrust loads. Returning to FIG. 12, one aspect of this feature may be described. Note that the thrust bearing plate 173 is located rearwardly of band segment 142 and, in particular, is welded to filler block 206, ie. the thrust bearing plate is positioned outwardly from the widthwise extent of the band segment with respect to the side of the segment most remote from the set screw connectors as at 208. Generally, this offset will amount to at least about one-half inch. By so positioning the thrust plate 173, the moment developed from the thrust asserted through nut 163 will tend to cause the assembly 170 to lift the band segment 142 upwardly rather than rotate it about its edge. This is found to be a beneficial arrangement for maintaining an effective engagement of the set screws, one of which is revealed at 211 in the figure. As described in conjunction with the connector assemblies 156 and 157, it is preferred that the set screw connectors associated with assemblies 169 and 170 be symmetrically disposed about each side of the position of an associated thrust rod. For example, set screw connectors 208 and 209 are seen to be at opposite sides of thrust rod 167. It has been determined that, for the pipe sizes as above described which are contemplated for use with the embodiment of the invention shown at 140, band segments having a widthwise extent of about 2 inches and a thickness of about ½ inch are adequate.

Figure 13:
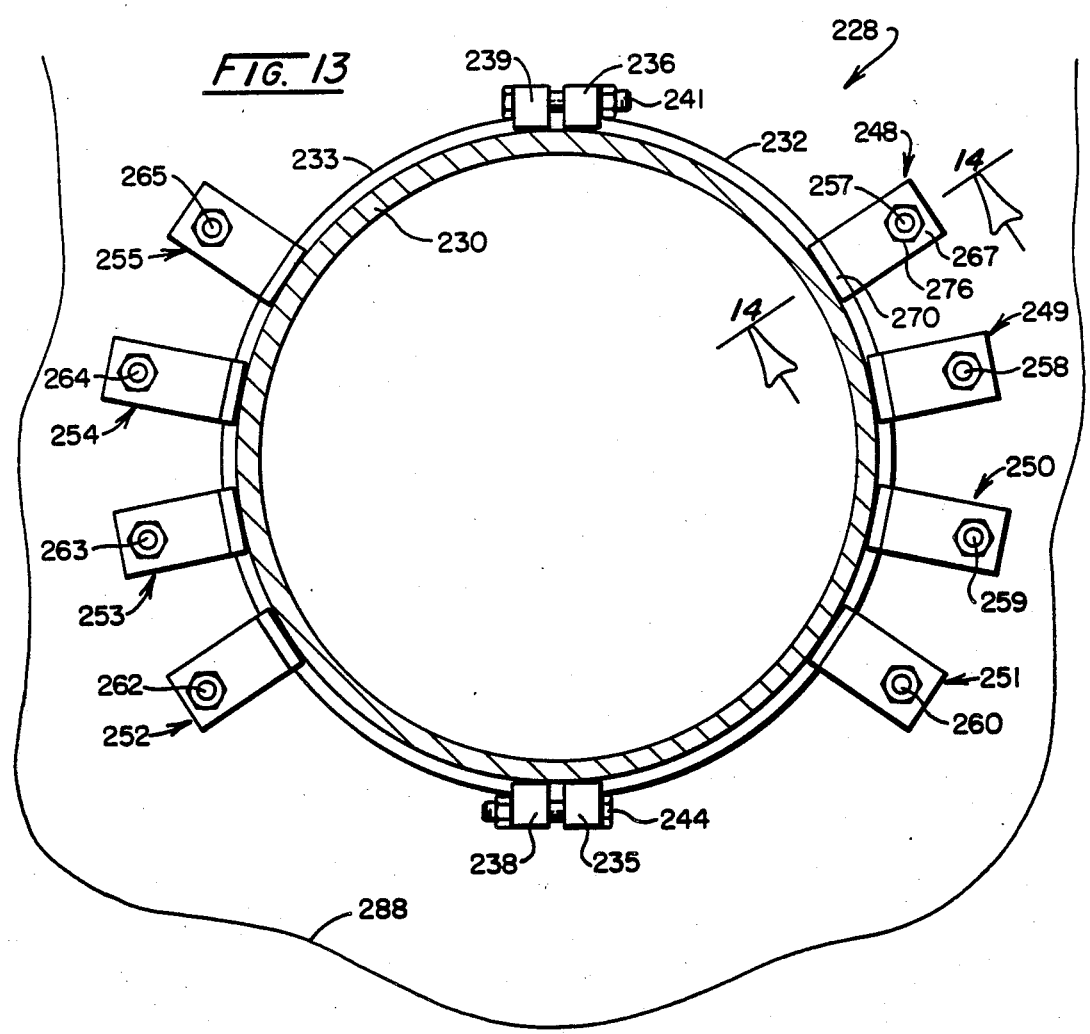
FIG. 13 is an end view of another embodiment of a thrust anchor according to the invention.

Referring to FIG. 13, another embodiment of the invention is revealed. This anchor structure, as represented generally at 228, is particularly suited for use in restraining the thrusts encountered in water pipe of nominal diameters 14 inches through 24 inches and the design may be extended to nominal pipe diameters of about 30 inches.

FIG. 13 shows a pipe 230 of the noted larger diametric sizes about which are positioned two arcuately shaped band segments 232 and 233. The ends of each of these band segments are welded to junction blocks which are structured in identical fashion with those described hereinabove. Note in this regard that band segment 232 is welded to junction blocks 235 and 236, while band segment 233 is welded to junction blocks 238 and 239. In the fashion earlier described, the segments 232 and 233 are drawn together by bolt and nut connectors extending through adjacent junction blocks. In this regard, note that junction blocks 236 and 239 are interconnected by bolt and nut assemblies, one of which is shown at 241 in FIG. 13 and the opposite one of which is shown at 242 in FIG. 15. Similarly, junction blocks 235 and 238 are retained by bolt and nut assemblies 244 and, as shown in FIG. 15, at 245.

Anchor structure 228 provides anchoring for eight thrust rods by connection therewith through thrust rod connectors 248–251 which are fixed to band segment 232 and diametrically oppositely and symmetrically dispose thrust rod connectors 252–255 which are fixed to band segment 233. Connectors 248–251 are shown connected in the manner earlier described with respective thrust rods 257–260, while thrust rod connectors 252–255 similarly restrain respective thrust rods 262–265. As is apparent, the number of thrust rod connectors utilized with the instant embodiment may be varied to suit the needs of the designer. However, it is preferred that they be provided in diametrically, symmetrically disposed pairs. Inasmuch as all of the thrust rod connectors for the instant embodiment are identically structured, only one is described herein. Accordingly looking to FIG. 14, thrust rod connector 248 is shown in sectional detail as including a thrust bearing plate 267 which is weldably connected to a base plate 268, which is welded, in turn, to arcuate band segment 232. As in the earlier embodiment, filler blocks 270 and 272 are positioned outwardly of the widthwise extent of band segment 232 and are welded, respectively, to bearing plate 267 and base plate 268. Bearing plate 267 is formed having an aperture 274 for receiving thrust rod 257 which imparts thrust forces through plate 267 in consequence of a bolt connection 276. Thrust plate 267 is additionally buttressed by two triangularly shaped buttress supports, one of which is shown at 278 in FIG. 14 and, additionally, at 280 as shown in FIG. 15.

Each of the thrust rod connectors of the instant anchor embodiment also include two set screw connectors as shown at 282 in FIG. 14 and at 282 and 283 in FIG. 15. As in the earlier embodiments, these set screw connectors are disposed symmetrically about the aperture within the thrust bearing plate which receives the thrust rod anchor. Note that set screws 284 and 285 are threadably retained within respective set screw connectors 282 and 283.

FIG. 14 additionally reveals that the thrust bearing plates for each of the thrust rod connectors of the instant embodiment are displaced outwardly from the arcuate band segment as at 232. As in the earlier embodiments, this provides improvement with respect to warping forces that otherwise would be induced within band segment 232. By moving the thrust bearing plate as at 267 rearwardly, moment inducing forces have a tendency to cause band segment 232 to lift directly upward rather than twist. This has been found to be advantageous in avoiding warpage which would otherwise disturb the indenting force torque developed at the set screws associated with each thrust rod connector. Note, additionally, that the widthwise extent of the band segment 232 is larger for larger pipes. It has been found advantageous to provide a widthwise extent of about 3 inches and a thickness of about ½ inch for the noted larger pipe sizes.

The anchor structure 228, while providing most desirable resistance to thrust loads, also is suited for more simplified installation procedures. Where field personnel are required to tighten bolts or make connections on the underside of pipes, considerable difficulties arise. A profile of a trench environment is represented at 288 in conjunction with the anchor structure 228. In installing the anchor strcuture 228, the two segments thereof are installed with the junction blocks as at 238–235 and 236–239 in a horizontal orientation. When in this initial orientation, bolt connectors as at 244 are tightened to a predetermined extent to bring junction blocks 235 and 238 into a desired proximity. However, the coupling including bolt and nut connectors 241 and 242 are permitted to remain loose. The entire assembly then is rotated about pipe 230 to the orientation shown in FIGS. 13 and 15. Upon completion of this rotation, junction blocks 236 and 239 are now positioned on the top of pipe 230 and the bolt and nut connectors 241 and 242 are readily tightened to provide for a tightening of the entire assembly.

FIGS. 16 and 17 reveal an embodiment of the thrust anchor of the invention which has been found to have highly desirable application to smaller pipe sizes, for example, sizes having nominal diameters of 3 inches through 8 inches. Generally, this range of pipe will include nominal diameters of 3, 4, 6 and 8 inches. Referring to FIG. 16, this smaller pipe anchor is shown generally at 290 in exploded perspective fashion. Similar to thrust rod anchor assembly 70, the assembly 290 is designed such that it is formed of two identical sub-structures 292 and 293. Sub-structure 292 is shown to include an arcuate band segment 294, while sub-structure 293 is shown having a corresponding arcuate band segment 296. Each of the band segments 294 and 296 extend slightly less than half-way about the surface of a pipe represented at 298 such that they may be drawn together in tension by connector structures represented in general at 300 and 302. For the instant embodiment, the band segments 294 and 296 are selected as being formed of hot rolled steel having a thickness of about ¼ inch and a width of 2 inches. The junction defining arrangements for the anchor structure 290 are formed without junction blocks but with outwardly disposed plate structures having rectangularly shaped joining portions 304 and 305 as associated with the connector structure 300, and at 306 and 307 in association with connector structure 302. The latter rectangular joining portion 307 may be observed in FIG. 17. Note that each of the rectangularly shaped joining portions 304–307 are identically structured and each is weldably connected to an end of an arcuate band section 294 or 296. The inwardly facing surfaces of each of the rectangularly shaped portions 304–307 constitute joining surfaces. Each of the rectangularly shaped portions 304–307 are formed having a respective circular opening 310–313 having diameters suitable for receiving bolt and nut connectors 316 and 318.

Each of the connector structures 300 and 302 includes a thrust bearing plate as shown, respectively, at 320 and 322. These thrust bearing plates 320 and 322 are supported by a combination of the earlier-described rectangularly shaped joining portions 304–307, and by buttress portions integrally formed therewith and shown at 324–327 extending therefrom. Thus, the rectangularly shaped joining portions combine with the buttress portions of the assemblages to provide support for the thrust bearing plates 320 and 322. However, welded connection is provided for the thrust bearing plates only in conjunction with one arcuate segment. In this regard, note that thrust bearing plate 322 is weldably connected to rectangularly shaped joining portion 306 and buttress portion 326 as shown in FIG. 16. On the other hand, FIG. 17 reveals that thrust bearing plate 320 is welded to the integrally formed rectangularly shaped joining portion 306 and buttress portion 325. The latter weld is represented at 330 in FIG. 17, while the weld coupling portions 306 and 326 to plate 322 is shown at 332. Further in this regard, it may be observed that joining portion 305 is coupled to band segment 296 by weld 334 end portions 307 and 327 are joined to the opposite end of that same band segment by weld 336 as represented in FIG. 17. Finally, portions 304 and 324 are shown welded to arcuate band segment 294 at weld 338.

Openings or apertures 340 and 341 are formed within respective thrust plates 320 and 322 for receiving the threaded ends of respective thrust rods at an outwardly disposed location as represented in FIG. 17. Respective nuts 346 and 347 complete the connection between the thrust rods 344 and 345 with the respective connector components 300 and 302. With the arrangement, for example, thrust is imposed from thrust rod 344 through associated nut coupling 346 and into the thrust plate 320. Plate 320, in turn, transfers the thrust through the buttress portion 325 and integral rectangular joining portion 305 to one end of band segment 296. Additionally, as revealed in FIG. 16, the thrust plate 320, by abuttable contact, imposes thrust loads through buttress portion 320 and associated rectangular joining portion 304 to one end of band segment 294. Of course, the same geometry of force transfer occurs in conjunction with connector 302.

FIGS. 16 and 17 further reveal that the anchor structure 290 incorporates a set screw assemblage in conjunction with each of the thrust rod connector assemblies 300 and 302. In this regard, note that internally threaded set screw connectors 350 and 351 are weldably fixed to the end of arcuate segment 294 and one side of rectangular joining portion 304, while corresponding connector 351 is weldably fixed to one end of arcuate band segment 296 and a portion of rectangular joining portion 305. Similarly, an identical set screw connector 352 is welded to an opposite end of band segment 294, as well as to rectangular joining portion 306 of connector 302, while the corresponding internally threaded set screw connector 353 is welded to one end of band segment 296 and rectangular joining portion 307 as shown in FIG. 17. Set screw connectors 350-353 are shown receiving respective set screws 356-359 which are structured identically with earlier-described set screws 110-113.

As in the case of earlier-described thrust rod anchor assembly 70, the anchor assembly 290 is designed such that it is formed of two identical sub-structures which, when combined utilizing bolt and nut connectors 316 and 318 effect the assembly of the entire anchor. Thus, any two of these identical sub-assemblies of the entire anchor structure 290 may be joined together over a pipe segment to form a complete assemblage. Because in the process of tightening the connector bolts 316 and 318, the non-welded abutting joining and buttressing components will slide across an associated thrust bearing plate as at 320 or 322, the openings or apertures 340 and 341 are displaced as in the case of the anchor structure 70. To limit the amount of such slide toward these openings, for example, a rectangular spacer as shown in FIG. 17 at 362 is welded to rectangular portion 305 and plate 320, while a similar spacer is shown in FIG. 16 at 363 which is welded to thrust plate 320 and associated rectangular portion 305.

Tests of the tie rod anchors described herein as well as precursor designs thereof have been carried out utilizing lengths of ductile iron water pipe of varying diameters each of which was provided a cap and gland closure structure at one end to which tie rods were attached and from which the tie rods extended to the anchors being tested which, in turn, were mounted upon the pipe. Tiebolts as shown in FIG. 4 were used to secure the thrust rods to the cap and gland closure structure. Thus, internal water pressure forces exerted upon the cap-gland structure were imparted to the thrust rods and by such thrust rods to the anchor structure. Each of the pipes utilized in the testing were mounted upon cradles such that they were supported horizontally, for example about two feet from ground level. At the opposite end of the pipe lengths of 18 feet or less, a non-movable, plug along with a water input conduit was provided. A gauge reading in pounds per square inch was coupled with the input conduit so as to provide a visual readout of the pressure of water within each pipe. Water pressure was developed either from the city of Columbus, Ohio, water supply source at about 95 psi or at elevated values using a hand actuated positive displacement pump. Slippage of either the end cap-gland structure positioned as above described to the pipe as well as the anchor structure being tested was measured through the utilization of a chalk mark placed on the outside surface of the pipe under test adjacent each of those components. Following the development of pressure, the slippage of the anchor under test was determined. Set screws when utilized with the anchor structures, in some instances were of the break off variety developing either about 80 foot pounds or 40-60 foot pounds for a low torque variety respective of torque. Where such set screws were utilized, the term "B.O." or "L.T." is shown in the set screw torque column of Table 1 to respectively represent 80 foot pounds break-off and 40-60 foot pounds low torque break-off. Where no set screws were used with the anchor structure, then, a "0" is provided in that column. Similarly, where the set screws were tightened by the operating personnel utilizing a typical wrench, for instance a 7 inch socket wrench, then the term "hand" is provided in the set screw torque column. Where torquing wrenches were utilized, then the value of the applied torque is indicated with a foot pound, "f.p." designation.

TABLE 1

| Test No. | Pipe Dia. | Anchor | Max Press (psi) | Anch. Slippage | S.S. Torque |
|---|---|---|---|---|---|
| 1 | 8 | FIG. 9 | 480 | yes | 0 |
| 2 | 8 | FIG. 9 | 720 | none | B.O. |
| 3 | 24 | FIG. 13 (mod) | 280 | ¼" one side | B.O. |
| 4 | 24 | FIG. 13 (mod) | 200 | ¼" one side | 80 f.p. |
| 5 | 24 | FIG. 13 (mod) | 300 | none | B.O. |
| 6 | 24 | FIG. 13 (mod) | 300 | none | 80 f.p. |
| 7 | 24 | FIG. 13 (mod) | 340 | none | B.O. |
| 8 | 24 | FIG. 13 (mod) | 300 | none | B.O. |
| 9 | 24 | FIG. 13 (mod) | 300 | none | B.O. |
| 10 | 24 | FIG. 13 (mod) | 250 | none | B.O. |
| 11 | 24 | FIG. 13 (mod) | 300 | none | B.O. |
| 12 | 24 | FIG. 13 | 300 | ¼" | B.O. |
| 13 | 24 | FIG. 13 | 300 | none | B.O. |
| 14 | 24 | FIG. 13 | 300 | none | B.O. |
| 15 | 16 | FIG. 13 (mod) | 320 | none | B.O. |
| 16 | 16 | FIG. 13 (mod) | 400 | ⅜" | B.O. |
| 17 | 12 | FIG. 9 | 150 | yes. | 0 |
| 18 | 12 | FIG. 9 | 330 | none | B.O. |
| 19 | 12 | FIG. 10 | 600 | none | B.O. |
| 20 | 12 | FIG. 10 | 400 | none | 60 f.p. |
| 21 | 12 | FIG. 10 | 400 | none | 50 f.p. |
| 22 | 12 | FIG. 10 | 400 | none | 40 f.p. |
| 23 | 12 | FIG. 10 | 400 | none | hand |
| 24 | 12 | FIG. 10 | 75 | yes | 0 |
| 25 | 8 | FIG. 9 | 500 | none | 60 f.p. |
| 26 | 8 | FIG. 9 | 500 | none | 50 f.p. |
| 27 | 8 | FIG. 9 | 500 | none | 40 f.p. |
| 28 | 8 | FIG. 9 | 500 | none | 30 f.p. |
| 29 | 8 | FIG. 9 | 500 | none | hand |
| 30 | 8 | FIG. 9 | 240 | yes | 0 |
| 31 | 16 | FIG. 13 (mod) | 400 | ⅛" | 60 f.p. |
| 32 | 16 | FIG. 13 (mod) | 400 | ⅛" | 50 f.p. |
| 33 | 16 | FIG. 13 (mod) | 400 | ⅛" | 50 f.p. |
| 34 | 16 | FIG. 13 (mod) | 400 | ⅛" | 40 f.p. |
| 35 | 16 | FIG. 13 (mod) | 400 | ⅛" | hand |
| 36 | 16 | FIG. 13 (mod) | 190 | yes | 0 |
| 37 | 8 | FIG. 16 | 550 | 1/32" | L.T. |
| 38 | 8 | FIG. 16 | 400 | 1/32" | L.T. |
| 39 | 6 | FIG. 16 | 400 | 0 | 60 f.p. |
| 40 | 6 | FIG. 16 | 400 | 0 | 60 f.p. |

Looking to test No. 1 of Table 1, the anchor structure of FIG. 9 was utilized in conjunction with an 8 inch diameter pipe. However, no set screws were utilized and anchor slippage was observed as pressure within the test pipe reached 480 psi. Test No. 2 utilizing the same anchor and pipe arrangement utilized four set screws as shown in FIG. 9 and these set screws were torqued to the above-noted break-off level of about 80 foot pounds. No slippage was observed as pressures reached 720 psi. A 24 inch diameter ductile iron pipe was utilized for test No. 3 in conjunction with 8 tie rods and an anchor structured somewhat similar to that shown in FIG. 13, however, utilizing two set screws on each side of each tie rod connector, a box shaped buttress assembly, as well as utilizing band segments as at 232 and 233 which were two inches wide as opposed to the recommended 3 inch width. The test reveals that as a pressure of 280 pounds is reached, a ⅛ inch slippage was observed on one side of the anchor structure. It further was observed that the 2 inch wide band segments were warping. The test personnel questioned whether the use of the additional two set screws with each of the tie rod connectors was helpful. The same design of anchor was utilized in conjunction with test No. 4, however, only one set screw was utilized in conjunction with each tie rod connector. These set screws were evenly set at 80 foot pounds torque. At 200 psi pressure, one side of the anchor slipped ¼ inch. Excessive stretching was noted in the 2 inch wide band segment components of the anchor.

Tests Nos. 5, 7, 8, 9, 10 and 11 were carried out utilizing 24 inch diameter ductile iron pipe and a modified version of the tie rod anchor shown in FIG. 13. The modification involved the utilization of two pairs of set screws in alignment with the tie rods and on either side of the tie rod connector components. A 3 inch wide band segment was utilized with this version. A box-shaped buttress assembly was utilized to support the thrust bearing plates of each thrust rod connector. The four set screws for each of the tie rod connectors were torqued to their break-off point or about 80 foot pounds. No slippage was seen to have occurred with these tests. Test No. 6 utilized hand tightening of the set screws with the same anchor structure as for the tests described immediately hereinabove. No slippage of the anchor was observed for a 300 psi pressure.

In tests Nos. 12-14, an anchor structure identical to that described in conjunction with FIG. 13 was utilized. In test No. 12, a weldament was broken at one junction block and band connection and a slippage of ½ inch was observed. All set screws were torqued to break-off or about 80 foot pounds for these tests. In test 14, no slippage was observed at 300 psi pressure. In test 13, the anchor held at 300 psi for 2 minutes. A cracking sound was heard, following which pressure dropped 280 psi and the left side of the anchor moved 1/16 inch.

Tests Nos. 15 and 16 show the utilization of the anchor structure described in conjunction with FIG. 13 upon a 16 inch nominal diameter ductal iron pipe. However, only four thrust rod connectors were provided. The set screws utilized were torqued to break-off or about 80 foot pounds. Test No. 16 shows no slippage at 320 psi and a ⅜ inch slippage at 400 psi. However, no slippage was observed for pressures up to 340 psi.

Tests 17 and 18 were conducted utilizing the anchor structure described in conjunction with FIG. 9. However, in test No. 17, no set screws were utilized and slippage was observed at 150 psi. By comparison, where set screws were utilized and torqued to their break-off point of about 80 foot pounds, then no slippage was observed at a pressure of 330 psi. Test No. 19 shows the use of the tie rod anchor described in conjunction with FIG. 10 as mounted upon a 12 inch nominal diameter ductile iron pipe and utilizing four tie rods. Set screws were torqued to the above-described break-off point and no slippage was observed at the anchor for a pressure of 600 psi.

Tests 20-36 were conducted for the purpose of determining whether lower torque values could be utilized with the anchor structures of the invention. As indicated above, effective performance utilizing lower torque values at the set screws permits the anchor structures to be utilized in conjunction with pipe formed of softer iron than that conventionally used currently in the United States of America. Tests 20-23 show that an anchor structure as described in conjunction with FIG. 10 positioned upon 12 inch nominal diameter pipe will not slip at a pressure of 400 psi where the set screws are torqued by hand, at 40 foot pounds, at 50 foot pounds and at 60 foot pounds. Test No. 24 shows that for the same arrangement, and no set screw utilization, slippage will occur at 75 psi applied pressure. To achieve the indicated torque values, only minimal rotation of the set screws was required. In this regard, ¾ turn was provided in conjunction with test 20 following tip contact of the set screw with the pipe surface. Correspondingly, one-half turn was required in conjunction with tests 21 and 22.

Tests 25-30 utilized the anchor structure described in conjunction with FIG. 9 mounted upon an 8-inch nominal diameter ductile iron pipe. As indicated, for tests 25-29, set screw torque values ranging from 30 foot pounds to 60 foot pounds as well as a torque applied by hand with a 7 inch socket wrench were provided. No slippage was observed at 500 psi applied pressure. Test No. 30 shows the effect of no set screw utilization, anchor structure slippage being observed at 240 psi applied pressure. Required set screw turning for tests 25-28 ranged from one turn in conjunction with test 25 to ⅛ turn for test No. 28.

Tests Nos. 31-35 utilized the anchor structure described in conjunction with FIG. 13, however, incorporating six symmetrically disposed tie rod connector assemblies and six associated tie rods. The anchor structure was positioned upon 16 inch nominal diameter ductile iron pipe and 400 psi pressure was applied. For each of the tests, a ⅛ inch anchor slippage was observed which is considered acceptable for field utilization. Set screw torques range from 40 foot pounds to 60 foot pounds as well as by hand as noted. Test No. 36 shows the same test arrangement as described in conjunction with tests 31-35, however no set screws were utilized. Excessive slippage was observed at 190 psi.

Tests 37-40 were carried out utilizing the embodiment described in conjunction with FIGS. 16 and 17. In test 37, the anchor movement was the noted 1/32 of an inch, while the cap on the pipe showed a movement of ¾ inch. The test set-up maintained a pressure of 500 psi for approximately 10 minutes. Testing of the set screw torque at break-off was 60 foot pounds for three of the set screws and 55 foot pounds for one of them. In test 40, six inch steel pipe was utilized along with a Smith Blair coupling No. 411. In the course of the test, a leak was noted at 300 psi in the front flange gasket, while at 400 psi a leak was in evidence at the back flange gasket.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. A thrust rod anchor for connection to a pipe of given external surface diameter, comprising:

arcuate band means including two arcuate band segments of predetermined width, each having an inwardly disposed surface of diameter substantially corresponding with said pipe external surface diameter and a predetermined circumferential length extending between the ends thereof so as to be mountable in end-to-end configuration around the surface of said pipe;

junction means weldably fixed to each arcuate band segment end and having a joining surface extending outwardly therefrom;

connector means for drawing adjacently disposed joining surfaces of said junction means towards each other to tension said band means about said pipe external surface; and at least two selectively spaced thrust rod connectors each having a thrust bearing plate rigidly supported by the assemblage of components including said arcuate band means and said junction means by welded connection with at least one said component segment end located at one said arcuate band for restraining forces developed within said thrust rods along a predetermined direction from a remote connection thereof, said plate having an opening formed therein for receiving a said thrust rod spaced a predetermined distance from said pipe external surface when said anchor is mounted thereupon, and each said thrust rod connector including buttress means extending toward said remote connection and rigidly supported by said assemblage for restrainably supporting said thrust bearing plate.

2. The thrust rod anchor of claim 1 in which each said arcuate band segment circumferential length is selected such that adjacent said joining surfaces are spaced apart subsequent to said drawing thereof towards each other.

3. The thrust rod anchor of claim 1 including indent means supported from said assemblage by welded attachment with at least one said component thereof and spaced from said thrust bearing plate toward said remote connection for generating and engaging within a recess upon said pipe external surface.

4. The thrust rod anchor of claim 3 in which said indent means comprise two set screws positioned adjacent and substantially mutually symmetrically disposed upon opposite sides of a said thrust rod when received by a said thrust rod connector.

5. The thrust rod anchor of claim 3 in which said thrust bearing plate is positioned a predetermined distance outwardly from the widthwise extent of said arcuate band segments with respect to the side thereof most remote from said indent means location.

6. The thrust rod anchor of claim 1 in which said thrust rod connectors are configured having a said thrust bearing plate and a first portion of said buttress means extending from one said junction means of each said arcuate band segment, and a second portion of said buttress means extending from the junction means oppositely disposed from said one junction means of each said arcuate band segment, said buttress means second portion being positioned in supporting abutting contact with an adjacent said thrust bearing plate when said two arcuate band segments are mounted in said end-to-end configuration.

7. The thrust rod anchor of claim 1 in which:

said junction means comprises a junction block fixed to each arcuate band segment end, extending outwardly from the widthwise extent thereof, having a junction block inwardly disposed surface positioned in substantial adjacency with the said inwardly disposed surface of said arcuate band segment, and said joining surface extends outwardly from said junction block inwardly disposed surface; and said connector means draws adjacently disposed said joining surfaces of adjacent pairs of said junction blocks towards each other to tension said band means about said pipe external surface.

8. The thrust rod anchor of claim 7 in which said thrust rod connectors are mounted upon two said junction blocks disposed in adjacency by welded connection of said thrust bearing plate with one said junction block and welded connection of said buttress means with the other said junction block.

9. The thurst rod anchor of claim 7 in which said thrust rod connectors are configured having a said thrust bearing plate and a first portion of said buttress means mounted upon and welded to one said junction block of each said arcuate band segment, and a second portion of said buttress means being mounted upon and welded to the junction block oppositely disposed from said one junction block of each said arcuate band segment, said buttress means second portion being positioned in supportive abutting contact with an adjacent said thrust bearing plate when two said arcuate band segments are mounted in said end-to-end configuration.

10. The thrust rod anchor of claim 7 including two additional thrust rod connectors weldably fixed to a select said arcuate band segment at a position spaced from the said junction blocks fixed thereto, said connectors being arranged to be mutually symmetrically disposed at opposite sides of said pipe when said segments are mounted in said end-to-end configuration.

11. The thrust rod anchor of claim 10 in which said arcuate band segment predetermined width is about three inches.

12. The thrust rod anchor of claim 9 including first indent means fixed to each said junction block at the end constituting the said outward extent thereof extending toward said remote connection.

13. The thrust rod anchor of claim 12 further comprising two additional thrust rod connectors each weldably fixed to a respective one of said two arcuate band segments and positioned in adjacency with a said junction block so as to be substantially diametrically oppositely disposed about said pipe surface when said arcuate band segments are mounted thereon in said end-to-end configuration.

14. The thrust rod anchor of claim 12 including second indent means fixed to each said additional thrust rod connectors at a location spaced from the said thrust bearing plates thereof toward said remote connection for generating and engaging within a recess upon said pipe external surface.

15. The thrust rod anchor of claim 14 in which the thrust bearing plates of said additional thrust rod connectors are positioned a predetermined distance outwardly from the widthwise extent of said two arcuate band segments with respect to the side thereof most remote from said indent means location.

16. The thrust rod anchor of claim 15 in which said arcuate band means band segment circumferential lengths are selected such that adjacent said junction block joining surfaces are spaced apart subsequent to said drawing together thereof.

17. The thrust rod anchor of claim 14 in which said second indent means are provided as set screws.

18. For use in a pipe joint restrainer system wherein elongate thrust rods are connected in tension between one side of a joint and a portion of remotely disposed pipe having a given axis and external surface diameter, the improved thrust rod anchor comprising:

- at least two arcuate band segments of predetermined width, each having an inwardly disposed surface of diameter substantially corresponding with said pipe external surface diameter and a predetermined circumferential length extending between the ends thereof so as to be mountable in end-to-end configuration around the surface of said pipe;
- a junction block weldably fixed to each said arcuate band segment and, extending outwardly from the widthwise extent thereof, having an inwardly disposed surface in substantial adjacency with the said inwardly disposed surface of said arcuate band segment, and a joining surface extending outwardly from said inwardly disposed surface;
- connector means for drawing adjacently disposed joining surfaces of adjacent pairs of said junction blocks towards each other to tension said arcuate band segments about said pipe external surface, said arcuate band segment circumferential lengths being selected such that said adjacent junction block joining surfaces are in spaced apart adjacency subsequent to said drawing thereof toward each other;
- at least two thrust rod connectors each fixed to a select one of said arcuate band segments at a location selectively spaced from said junction blocks, each said connector having a thrust bearing plate rigidly supported by welded connection with said band segment for restraining force imposed from a said thrust rod along said longitudinal axis from a remote connection thereof, said plate having an opening formed therein for receiving a said thrust rod spaced a predetermined distance from said pipe external surface when said anchor is mounted thereupon and each said thrust rod connector including buttress means fixed to said thrust bearing plate, extending toward said remote connection, rigidly supported by and welded to said band segment for restrainably supporting said thrust bearing plate; and
- set screw means including at least one internally threaded set screw connector fixed to each said thrust rod connector at a location spaced from the thrust bearing plate thereof toward said remote connection and adjacent said arcuate band segment.

19. The thrust rod anchor of claim 18 in which each said thrust bearing plate is positioned a predetermined distance outwardly from the widthwise extent of said arcuate band segment from which it is supported.

20. The thrust rod anchor of claim 18 in which said thrust rod connectors are arranged to be mutually symmetrically disposed at opposite sides of said pipe when said segments are mounted in said end-to-end configuration.

21. The thrust rod anchor of claim 20 in which said arcuate band segment predetermined width is about three inches.

22. The thrust rod anchor of claim 21 in which each said thrust rod connector includes a base plate weldably fixed to said arcuate band segments, said buttress means comprises two spaced triangular shaped plates welded to said thrust plate and said base plate and a filler block fixed between said band segment and said thrust bearing plate.

* * * * *